Dec. 4, 1956  E. J. KONRAD  2,773,165
COOKING AND HEATING PLATES
Filed Oct. 29, 1954
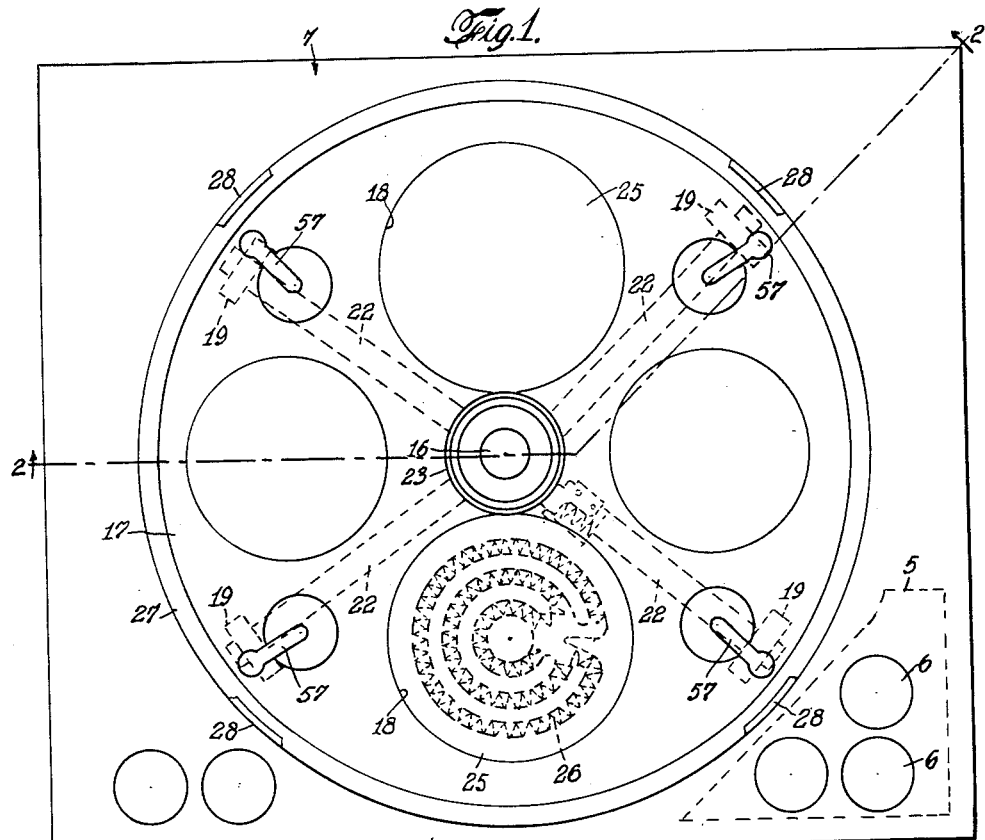
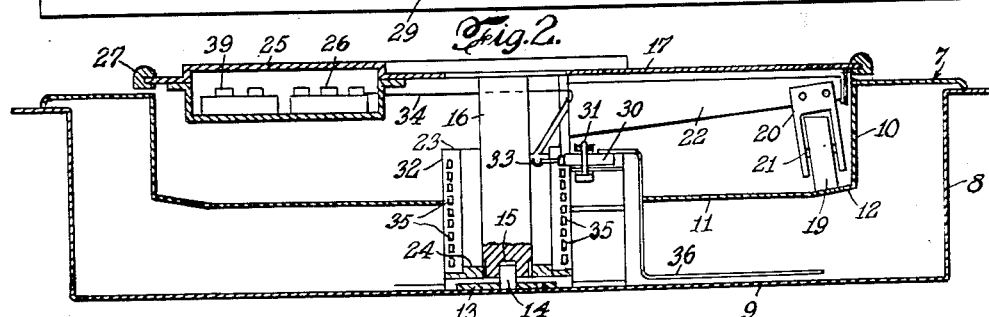
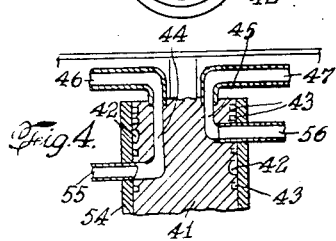
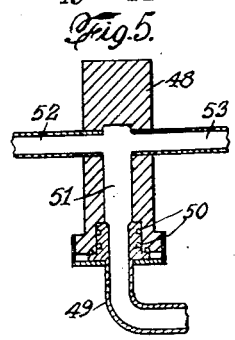
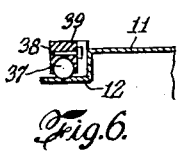
INVENTOR.
ERICH KONRAD
BY
ATTORNEY

United States Patent Office 2,773,165
Patented Dec. 4, 1956

2,773,165

COOKING AND HEATING PLATES

Erich J. Konrad, Harvard, Ill.

Application October 29, 1954, Serial No. 465,493

1 Claim. (Cl. 219—37)

This invention relates to hot plates, steam tables, heating plates and the like for stoves, and particularly to what I choose to term a cooking and heating plate.

The main object of my invention is to provide a special plate adapted for installation on a stove or support for cooking and heating foods, which may be heated by various heating means.

An ancillary object of the invention is to provide such a heating and cooking plate that may be used in multiple on a stove and may be arranged in most convenient manner for use by a cook or chef.

Another object is to have such a cooking and heating plate disposed in multiple in a group at or near the front of the stove so that the plates may be used without loss of time or effort, and without danger of injury or burns upon the hands or arms of the chef from reaching over open flame or heater elements in front of the cooking and heating plates.

A further object is to have such cooking and heating plates that are heated by fuel or by electric current, whichever they may be designed for, and capable of regulation and of being turned on and off at will.

It is a practical object of the invention to have such a cooking and heating plate that may be used alone or in a group or series, according to the arrangement desired.

An important object, withal, is to have a group or series of cooking and heating plates adapted to be arranged on a stove heating plate and capable of being changed in position as desired by the cook or chef.

Other objects and advantages of my invention will appear in greater detail as the specification proceeds.

In order to facilitate ready comprehension of my invention for a proper appreciation of the salient features of the same, the invention is illustrated on the accompanying drawing forming part hereof, and in which:

Figure 1 is a top plan view or elevation of a cooking and heating plate ensemble made according to the invention and embodying the same in a practical form;

Figure 2 is a vertical section of the same ensemble as taken on line 2—2 in Figure 1;

Figure 3 is fragmentary plan view of a detail modification of the central portion of the apparatus of Figures 1 and 2;

Figure 4 is a vertical section of the same portion of apparatus shown in Figure 3 as taken on line 4—4 in Figure 3;

Figure 5 is another similar section of a further modification; and

Figure 6 is a modification of a detail.

Throughout the views, the same reference numerals indicate the same or like parts.

On stoves and ranges using gas, oil or electricity, it is quite usual to have a pair or a group of burners or heating plates and the like arranged on the top of the stove or range, some being at the rear. Such rear positions for heating plates or the like are definitely disadvantageous, for the arms and hands of a cook or chef may be burned by the other burners or plates when reaching back to tend to pots on these rear plates. On the other hand, it is always a definite advantage to have one or more plates or burners at the front or near side of the stove where they are directly accessible without any reaching.

Upon considering this problem, it has occurred to me that a stove or range should be equipped with a group of heating plates or burners that are mounted so as to be rotatable as a group to present any selected plate or burner to the cook or chef at the near side of the stove when desired. As a result of such consideration, I have succeeded in producing a stove with a series or group of heating plates or burners that may be shifted rotatably as outlined as will now be set forth in greater detail in the following.

Hence, in the practice of my invention, and referring also again to the drawing, a stove or range top, generally indicated at 7 has a casing 8 with a bottom 9 and adapted to form a housing for an upper guide casing 10 with a bottom 11 formed at the marginal portion thereof into an inclined rail or wheel guide 12, for a purpose that will presently appear. The housing and casing together form a stationary stove housing or body and are preferably cylindrical in outline as seen from the top, and upon the bottom 9 is located a center plate 13 to which is secured an upright pivot pin 14 extending up into the center guide hole 15 in the bottom end of a vertical center post 16 having a metal disk or top 17 secured to and surmounting the upper end of this post to be rotatable therewith about pin 14.

In order further to support the disk 17 in rotation, a group or series of guide rollers 19, 19 rotatably mounted in a series of roller mountings 20 on pins or shafts 21, the mountings being secured to a cross piece or radial arms 22 extending outwardly from a central guide cylinder 23 surrounding the center post 17 and secured thereto by a bottom ring 24. The rollers ride on the bottom rail 12 and allow the disk to rotate with post 16 while maintaining its horizontal level. The mentioned top disk has a group of openings 18, 18, etc., occupied by an equal number of heating plates 25, 25, etc., which may also be gas or oil burners, or the like beneath the plates at 26, for example. The periphery of the disk 17 has a rim 27 with several hand holds 28, 28 recessed into the edge thereof to facilitate turning the disk 17 to present the particular heating plate 25 to the near side or front 29 of the stove at will.

When the heating units 26 are electric heaters, current is carried to the heaters by a conductor that extends to a contact brush 30 pivoted on a pivot pin 31 and making contact with a commutator ring 32 on cylinder 23 which is connected to one heating unit 26 through connector 33 and conductor 34. In similar fashion, the other rings 35, 35, etc. are connected to the other electric heating units (not shown) but only the plates 25 covering the units are shown. The other brushes similar to 30 with its pivot 31 are not shown, as this one sufficiently reveals the construction of the electrical parts in toto as fed by the conductor 36, while the return goes through ground or the frame of the apparatus through the bottom ring 24. The main bulk of cylinder 23 is of insulating material such as fibre or plastic upon which commutator rings are mounted.

Switches 6, 6 in block 5 serve to control the current.

The rollers 19 may be replaced by anti-friction ball bearings 37 in mountings 38 as shown in Figure 6, if desired. Instead of electric heating, gas or oil heating may be used, and then each heating plate will cover a gas burner 39, while the central portion of the disk 17 and its support and central mounting will be as shown at 40 in Figures 3 and 4. The central cylinder 41 has a series of circular grooves 42, 42, etc., while a series of packing rings 43, 43 are also mounted in the cylinder surface to render the grooves gas tight for conducting gas up through several tubes 44, 45 in the cylinder through grooves 42 to the burners 39 through upper tubes or pipes 46, 47.

A modification of the cylinder is shown in Figure 5 at 48 wherein the bottom gas supply pipe 49 extends upwardly into the cylinder with packing rings 50 ensuring gas tight connection, and the upper portion of the conduit 51 therein branching off into branches 52, 53 to the burners. This is in contrast to the construction of Figures 4 and 5, in which the cylinder 40 rotates within the shell 54 having the supply pipes 55, 56 extending to the same for supplying the gas to grooves 42.

In any case, when gas is used as fuel, the gas supply to the burners may be controlled by manually operated valves 57, 57, etc., individually associated with each burner beneath plates 25.

Manifestly, variations may be resorted to, and parts and features may be modified or used without others within the scope of the appended claim.

Having now fully described my invention, I claim:

A cooking and heating plate assembly for a stove or range having a stationary stove housing, including a rotatably mounted disk occupying at least a portion of the upper part of the stove and having a plurality of openings, heating plates with heating units located individually in said openings and capable of individually being brought to the fore part of the stove by manually rotating the disk at will, means for supplying heating medium to the heating units, means for controlling said medium supplied to any heating unit and heating plate upon said disk, said stove housing having a casing mounted in the upper portion thereof with a bottom therein, an upright post pivotally mounted upon the bottom for guiding and supporting the disk in rotation, a plurality of radial arms beneath the disk having rollers therebetween rolling upon said bottom distant from the post to support the disk in all rotated positions, a rim upon the disk periphery with hand holds recessed into its edge, said post having a cylinder surrounding it and provided with commutator rings connected to the heating units on the disk, and movable contact brushes connected to a current supply in contact with the rings and with switches controlling the brushes.

References Cited in the file of this patent
UNITED STATES PATENTS

| | | |
|---|---|---|
| 1,204,266 | Garrison | Nov. 7, 1916 |
| 1,507,883 | Campbell | Sept. 9, 1924 |
| 1,621,234 | Carpenter | Mar. 15, 1927 |
| 1,984,782 | Brand | Dec. 18, 1934 |
| 2,001,713 | Ehret | May 21, 1935 |
| 2,141,742 | Ehret | Dec. 27, 1938 |
| 2,591,072 | Hughes | Apr. 1, 1952 |